United States Patent [19]

Ogusu

[11] E Patent Number: Re. 33,695

[45] Reissued Date of Patent: Sep. 17, 1991

[54] DISC CASE

[75] Inventor: Mikio Ogusu, Hamamatsu, Japan

[73] Assignee: Yamaha Corporation, Hamamatsu, Japan

[21] Appl. No.: 242,443

[22] Filed: Sep. 8, 1988

Related U.S. Patent Documents

Reissue of:

[64] Patent No.: 4,669,078
Issued: May 26, 1987
Appl. No.: 751,731
Filed: Jul. 3, 1985

[30] Foreign Application Priority Data

Jul. 4, 1984 [JP] Japan ..... 59-101162[U]
Sep. 11, 1984 [JP] Japan ..... 59-137561[U]
Sep. 11, 1984 [JP] Japan ..... 59-137562[U]

[51] Int. Cl.[5] ..... B65D 85/30; G11B 23/04

[52] U.S. Cl. ..... 369/291; 360/133; 206/444

[58] Field of Search ..... 369/291, 77.2; 206/444, 206/309, 312; 220/306; 360/133

[56] References Cited

U.S. PATENT DOCUMENTS

| | | | |
|---|---|---|---|
| 3,526,884 | 9/1970 | Buslik et al. | 206/444 |
| 4,084,540 | 4/1978 | Maier | 369/202 |
| 4,477,894 | 10/1984 | Clurmann | 369/291 |
| 4,488,645 | 12/1984 | Yamaguchi | 206/444 |
| 4,501,357 | 2/1985 | Park | 206/312 |
| 4,535,888 | 8/1985 | Musselder | 206/444 |
| 4,541,036 | 9/1985 | Landries et al. | 220/306 |
| 4,549,669 | 10/1985 | Razporka | 220/306 |
| 4,571,718 | 2/1986 | Cahill et al. | 369/291 |
| 4,577,756 | 3/1986 | Hennessy et al. | 220/306 |

FOREIGN PATENT DOCUMENTS

| | | | |
|---|---|---|---|
| 0077566 | 4/1983 | European Pat. Off. . | |
| 0114631 | 8/1984 | European Pat. Off. . | |
| 0137965 | 4/1985 | European Pat. Off. . | |
| 47-37849 | 11/1972 | Japan . | |
| 56-54641 | 5/1981 | Japan | 369/291 |

*Primary Examiner*—Steven L. Stephan
*Assistant Examiner*—Kenneth B. Wells
*Attorney, Agent, or Firm*—Cushman, Darby & Cushman

[57] ABSTRACT

A disc case is constructed for receiving releasably a disc on which information data are recorded and for supporting the disc rotatably in the disc case, and can be set into a reproducing apparatus with the disc received in the disc case. The disc case comprises: a first case member having a disc receiving area on its central portion; a second case member associated with the first case member to be able to open and close the disc receiving area; and locking means having first and second locking members, a first locking member being formed integrally on one of the first and second case members and a second locking member being formed integrally on the other of the first and second case members and locks the first and second case members in a closed state with the disc receiving area closed in cooperation with the first locking member. The second locking member has an opening button which elastically deforms the second locking member and release the locking of the first and second case members when operated. The second locking member further comprises a spacing member which space the first and second case member from each other in the direction to open when the operating button is operated.

16 Claims, 16 Drawing Sheets

FIG. 13
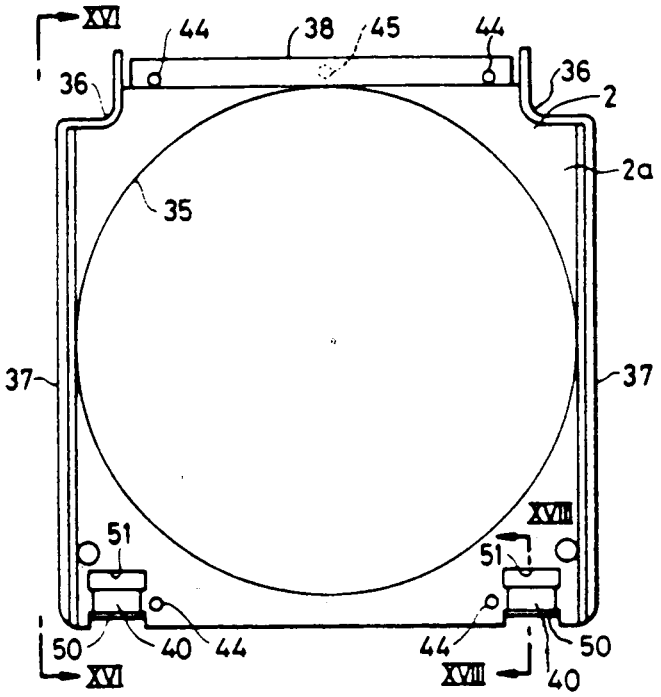
FIG. 17
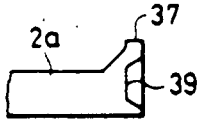
FIG. 18
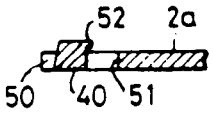
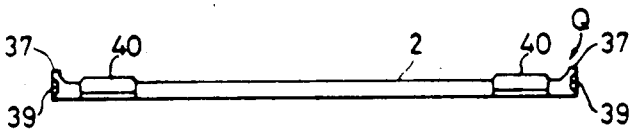
FIG. 14
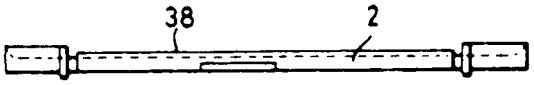
FIG. 15
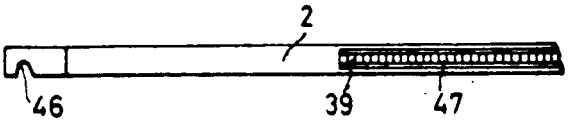
FIG. 16

DISC CASE

Matter enclosed in heavy brackets [ ] appears in the original patent but forms no part of this reissue specification; matter printed in italics indicates the additions made by reissue.

BACKGROUND OF THE INVENTION (a) Field of the Invention

The present invention relates to a disc case for receiving a disc on which information data are recorded and for supporting the disc rotatably in the disc case, the disc case being able to be set into a reproducing apparatus with the disc received in the disc case; and more particularly to a locking mechanism for locking the disc case which comprises a first case member and a second case member associated with said first case member to be able to open and close with each other.

(b) Description of the Prior Art

There is already known a disc case for a microfloppy disc used in relation to various office automation equipments. Such disc case receives a microfloppy disc so that the disc can not be taken out of the case. Thus, when the disc is to be reproduced, a disc reproducing apparatus may be charged with the disc case together with the disc to be reproduced. Therefore, the disc case of such construction can not have the disc replaced and is not suitable for a disc case for a compact disc of the Compact Disc Digital Audio System.

Therefore, the present applicant has suggested in U.S. patent application Ser. No. 721,667 a disc case constructed to receive a disc so that the disc can be replaced. This disc case is formed of an upper case and a lower case which can be opened and closed with each other so that, when the upper case and lower case are opened, the disc will be able to be replaced. Such disc case must be locked in a closed state by a locking mechanism so that the upper case and the lower case may not accidentally open, and this locking mechanism is practically required to be easy to operate for opening the case.

There is already known such locking mechanism of this kind wherein, for example, a recess is formed in one of an upper case and a lower case, and a projection is formed in an other so that the upper case and the lower case may be locked with each other by elastically engaging the recess and the projection with each other. It is adopted, for example, in a case for storing a compact disc. In such construction, in the case of locking or unlocking it, it is necessary to elastically deform the entire case, and both the easy operation for opening the case and the positive operation for locking the case are contradictory to each other and have been difficult to be compatible with each other.

Also, a locking mechanism of such construction as is shown, for example, in FIG. 1 is known. This locking mechanism is a device adopted in a dry battery containing part of such portable audio device as, for example, a portable radio set, wherein an engaging part d is formed at one end of a lid c for opening and closing an opening b of a device body a, and an opening and closing operation part h consisting of an elastically deformable part f of a U-shaped cross-section having a pawl e and an operating button g are formed at the other end of the lid c so that, when the lid c is to be closed, as shown in the drawing, the engaging part d and pawl e are engaged with the edge parts of the opening b and, when the lid c is to be opened, the operating button g is moved in the direction indicated by the arrow A to disengage the pawl e from the device body a and then the operating button g will be lifted (upward) in the direction indicated by the arrow B to take out the lid c.

In the conventional lid opening and closing device above mentioned, in the case of opening the lid c, the operating button g will have to be moved in the direction indicated by the arrow A and then further in the direction indicated by the arrow B and therefore there is a problem that the lid c opening operation is difficult.

SUMMARY OF THE INVENTION

An object of the present invention is to provide a disc case of the kind described at the beginning which is easy in the opening and closing operation, is positive in the locking operation and is simple in the structure.

This object is solved by a disc case for receiving a disc on which information data are recorded and for supporting the disc rotatably in the disc case, the disc case being able to be set into a reproducing apparatus with the disc received in the disc case and receiving the disc releasably, wherein the disc case comprises: a first case member having a disc receiving area on its central portion; a second case member (an upper case) associated with the first case member to be able to open and close the disc receiving area; and locking means having two locking members, a first locking member of which is formed integrally on one of the first and second case members and a second locking member of which is formed integrally on the other of the first and second case members and locks the first and second case members in a closed state with the disc receiving area closed in cooperation with the first locking member, the second locking member having an operating part which release the locking of the first and second case members when operated.

According to this invenition, the first case member having the disc receiving area and the second case member are to be locked together by means of locking members formed integrally with them so that the first and second case members can be easily locked and unlocked with each other and are simple in the construction.

The object of the present invention is also obtained by a disc case for receiving a disc on which information data are recorded and for supporting the disc rotatably in the disc case, the disc case being able to be set into a reproducing apparatus with the disc received in the disc case and receiving the disc releasably, wherein the disc case comprises: a first case member having a disc receiving area on its central portion; a second case member associated with the first case member to be able to open and close the disc receiving area; and locking means for holding the first and second case member in a closed state with the disc receiving area closed; the first case member consisting of: a frame with a recess, which forms the disc receiving area, on its central portion; and a magazine plate applied to a surface of the frame; the magazine plate being provided with an inserting aperture through which a turntable of the reproducing apparatus for driving to rotate the disc is introduced in a region of a position corresponding to the recess of the frame; and another inserting aperture through which a reproducing head of the reproducing apparatus accesses a portion of information data recorded on the disc.

By this construction, the disc case is made thinner and is made simpler in the construction.

Further, the object of the present invention is obtained by a disc case for receiving a disc on which inforamtion data are recorded and for supporting the disc rotatably in the disc case, the disc case being able to be set into a reproducing apparatus with the disc received in the disc case, wherein the disc case receives the disc releasably and wherein, during set into the reproducing apparatus, while the disc case is fixed in position within the reproducing apparatus, the disc is driven in rotation and the information data are reproduced by the reproducing apparatus, and wherein the disc case comprises: a first case member having a disc receiving area on its central portion; a second case member associated with the first case member to be able to open and close the disc receiving area; locking means for holding the first and second case member in a closed state with the disc receiving area closed; and at least a pair of holes, arranged on at least one surface of the disc case, for positioning the disc case by engaging projections arranged on the reproducing apparatus during set into the reproducing apparatus, one hole of the pair of holes being formed as a loose hole.

By this construction, the disc case is easily and positively set and locked in a predetermined position within a reproducing apparatus.

BRIEF DESCRIPTION OF THE DRAWINGS

FIG. 13 is a plan view of the magazine frame in FIG. 4;

FIG. 14 is an elevation of the magazine frame in FIG. 4;

FIG. 15 is a back view of the magazine frame in FIG. 4;

FIG. 16 is a partly side view along line XVI—XVI in FIG. 13;

FIG. 17 is an enlarged view of the part indicated by the arrow Q in FIG. 14;

FIG. 18 is a sectioned view along line XVIII—XVIII in FIG. 13;

DESCRIPTION OF THE PREFERRED EMBODIMENTS

The present invention shall be explained in the following with reference to the drawings on the basis of the embodiments as applied to disc cases for a compact disc of the Compact Disc Digital Audio System.

FIGS. 2 to 24 show a first embodiment of the present invention.

Figure 1:
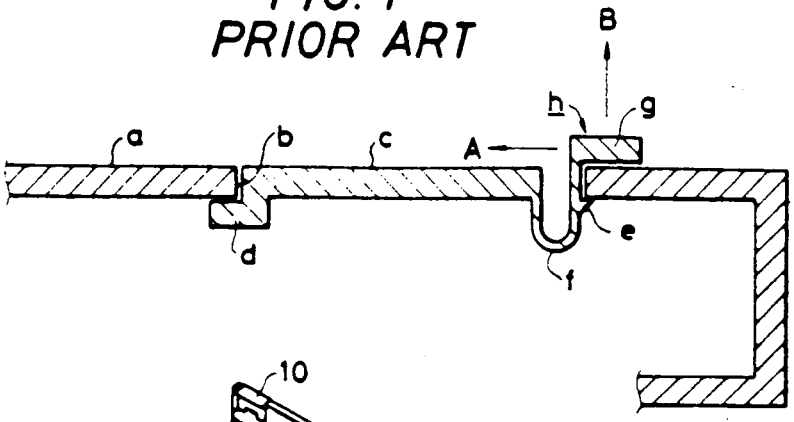
FIG. 1 PRIOR ART
FIG. 1 is a partly sectioned view showing an example of the conventional locking mechanism.
Figure 2:
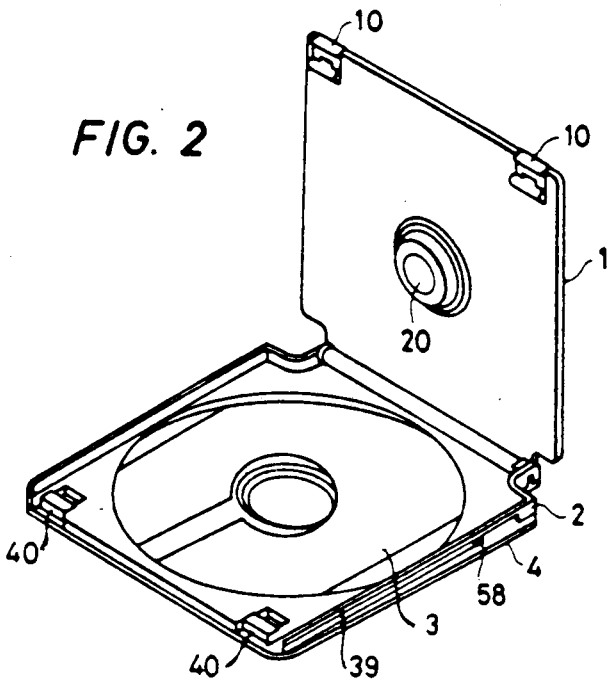
FIG. 2 is a perspective view of an embodiment of the disc case according to the present invention in an opened state.
Figure 3:
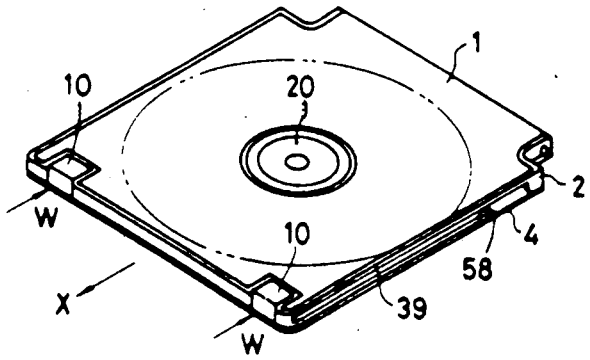
FIG. 3 is a perspective view of the disc case in FIG. 2 in a closed state.
Figure 4:
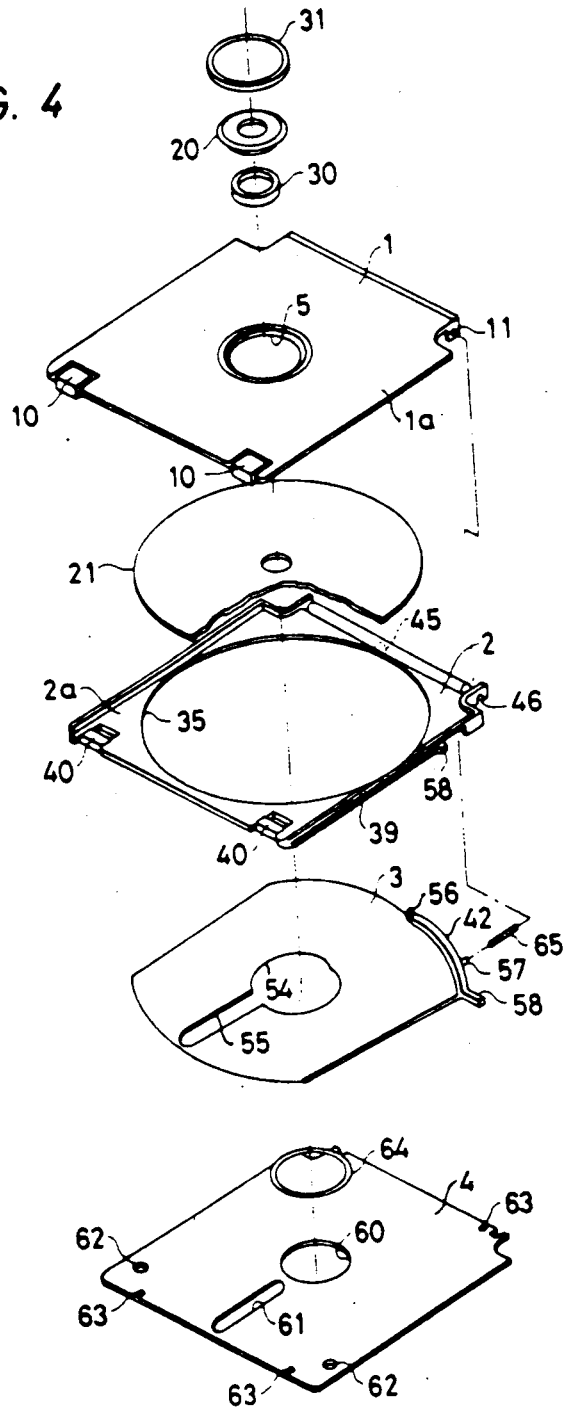
FIG. 4 is an exploded perspective view of the disc case in FIG. 2.
Figure 5:
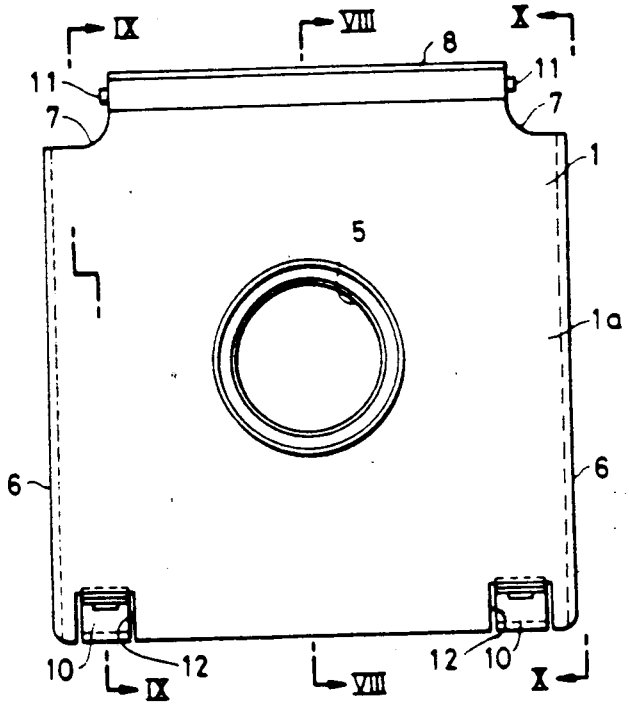
FIG. 5 is a plan view of the upper case in FIG. 4.
Figure 6:
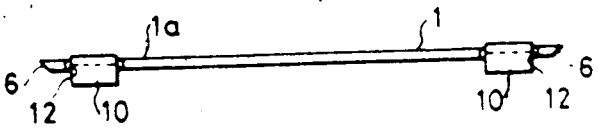
FIG. 6 is an elevation of the upper case in FIG. 4.
Figure 7:
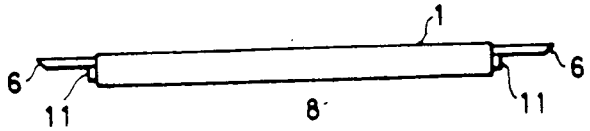
FIG. 7 is a back view of the upper case in FIG. 4.
Figure 8:
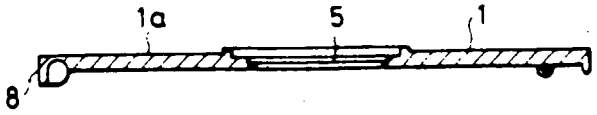
FIG. 8 is a sectioned view along line VIII—VIII in FIG. 5.

FIGS. 2 to 4 show the entire construction of the disc case explained hereunder. As shown in these drawings, the disc case has as main components an upper case 1, a magazine frame 2, a shutter plate 3 and a magazine plate 4.

Figure 22:
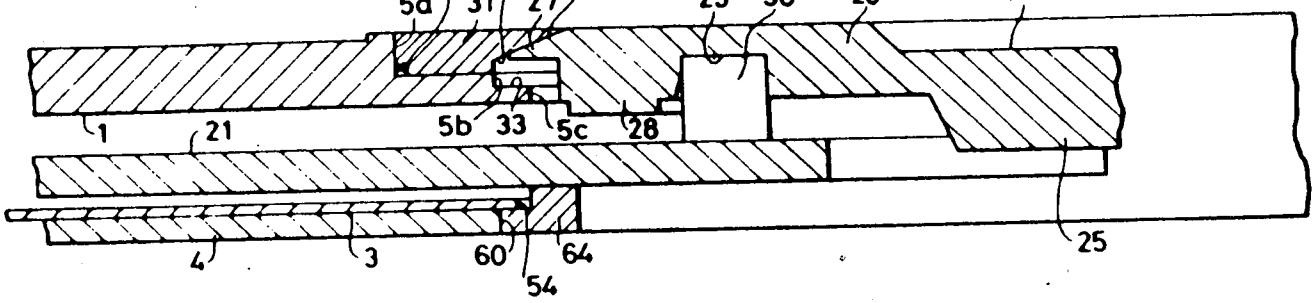
FIG. 22 is a partly enlarged vertically sectioned view of the disc case in FIG. 2 containing a disc.
Figure 23:
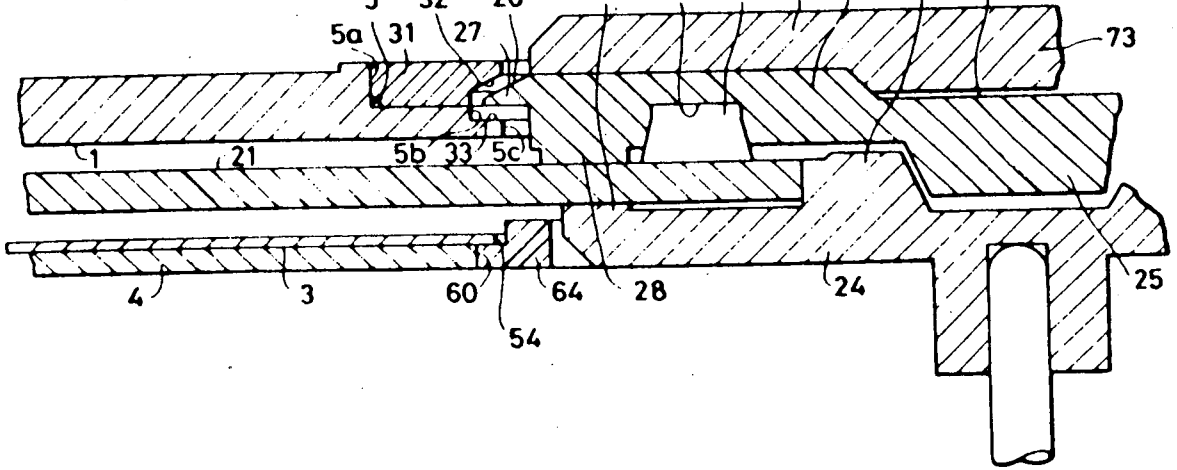
FIG. 23 is a partly enlarged vertically sectioned view of the disc case in FIG. 2 containing a disc as set into a reproducing apparatus.

As shown in FIGS. 5 to 12, the upper case 1 is a square plate-shaped body. This upper case 1 integrally molded of a transparent synthetic resin, in a main wall part 1a of which a hole 5 is formed in its central part, tapered parts 6, 6 are formed respectively on both right and left side edges thereof, right and left cut parts 7, 7 are formed in the rear end part thereof, a rear wall part 8 is formed on the rear end edge of the lower surface and right and left unlocking operating parts 10, 10 are formed in the front end part. As shown in FIGS. 22 and 23, the hole 5 is so formed as to steppedly reduce in the diameter in turn downward and consists of a large diameter part 5a, a medium diameter part 5b and a small diameter part 5c. Bosses 11, 11 for the connection with the magazine frame 2 are formed on the right and left outer end surfaces of the rear wall part 8.

Figure 9:
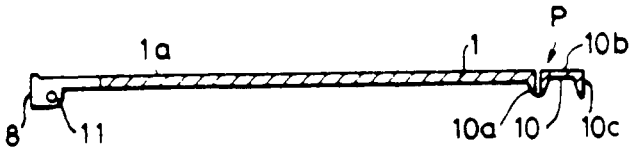
FIG. 9 is a sectioned view along line IX—IX in FIG. 5.
Figure 10:
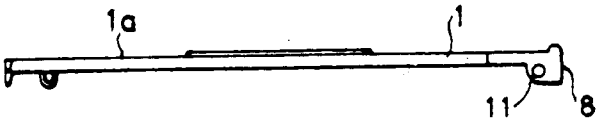
FIG. 10 is a sectioned view along line X—X in FIG. 5.
Figure 11:
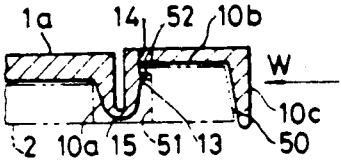
FIG. 11 is n enlarged view of the part indicated by the arrow P in FIG. 9.
Figure 12:
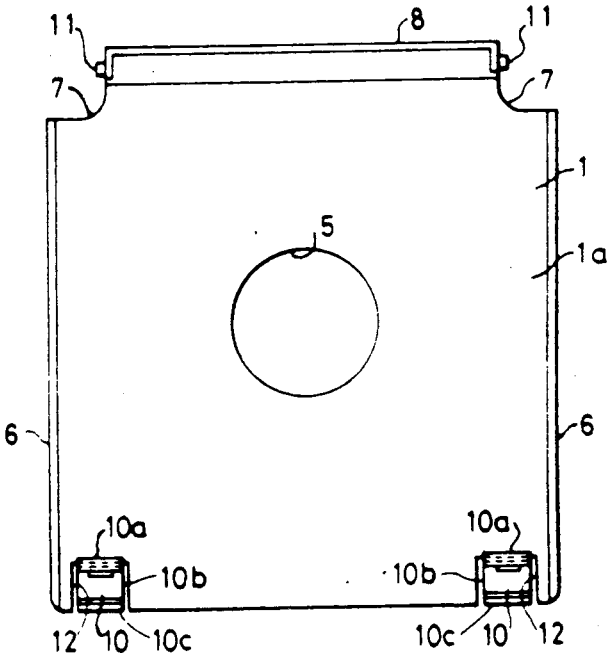
FIG. 12 is a bottom view of the upper case in FIG. 4.
Figure 19:
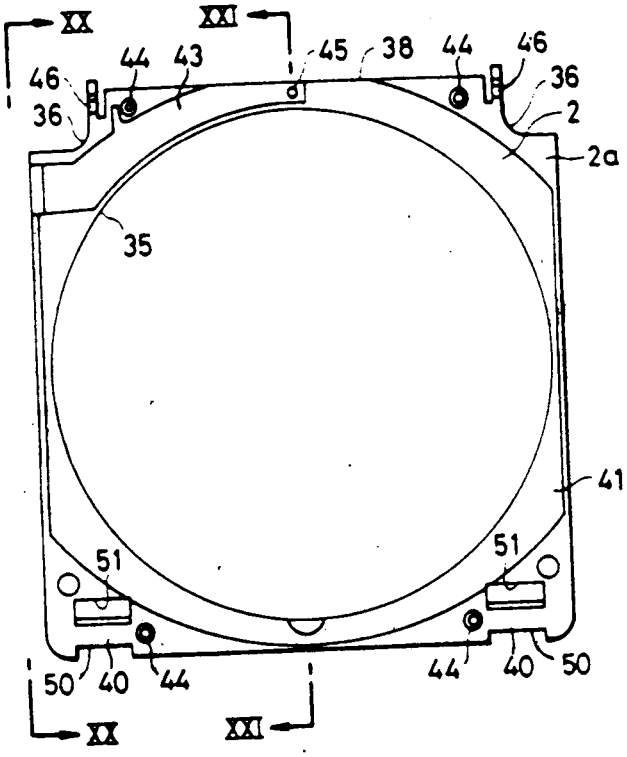
FIG. 19 is a bottom view of the magazine frame in FIG. 4.
Figure 20:
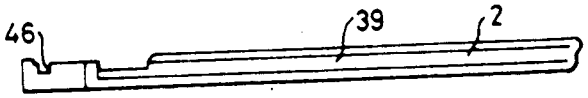
FIG. 20 is a partly side view along line XX—XX in FIG. 19.
Figure 21:
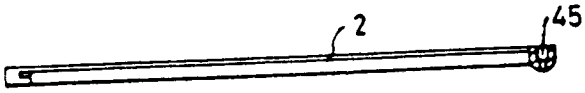
FIG. 21 is a sectioned view along line XXI—XXI in FIG. 19.

The above mentioned operating parts 10 are to lock the upper case 1 and the magazine frame 2 in a closed state in cooperation with a part of the magazine frame 2 and to unlock them when operated to unlock them and are formed within a recess 12 arranged in the front end part of the main wall part 1a. That is to say, as shown in FIGS. 9 and 11, each operating part 10 consists of a bent part 10a of a U-shaped cross-section connected to the lower surface of the inner end edge of the recess 12 of the main wall part 1a, a plate part 10b extending forward from the front side upper end of this bent part 10a and an operating wall part 10c extending downward from the front end of the plate part 10b. In this case a pawl 13 projecting obliquely upward is formed on the front end surface of the bent part 10a, and a hole 14 is formed in the rear end part of the plate part 10b. The bent part 10a is made so thin in the lower part to form a thin part 15 that the pawl 13 can be displaced forward and rearward by flexing the thin part 15.

In the upper case 1 formed as mentioned above, as shown in FIGS. 2, 4, 22 and 23, a stabilizer 20 is arranged within the hole 5. The stabilizer 20 is a member for holding a disc (compact disc) 21 and is a disc-shaped member made of a synthetic resin. In this stabilizer 20, a recess 23 to be engaged with a clamper 22 of a disc reproducing apparatus (detailed later) is formed in the central part of the upper surface, a projection 25 to be engaged with a turntable 24 of the disc reproducing apparatus is formed in the central part of the lower surface, an engaging part 27, the upper surface of which is a tapered surface 26, is formed on the outer peripheral part, a disc holding part 28 is formed on the outer peripheral edge of the lower surface and a groove 29 is formed inside this holding part. A sponge ring 30 is arranged by means of adhesive or the like as projected downward in the lower part within the groove 29.

A ring 31 made of a synthetic resin for preventing the stabilizer 20 arranged within the hole 5 from being pulled out upward is fixed by means of adhesive, welding etc. within the large diameter part 5a of the hole 5. In this construction, the stabilizer 20 is not pulled out upward as the tapered surface 26 of the engaging part 27 engages with the tapered surface 32 formed on the inner peripheral surface of the ring 31 and is not pulled out downward as the engaging part 27 engages with the step part 33 between the above mentioned intermediate diameter part 5B and small diameter part 5c, and is movable up and down within a range regulated by the above mentioned tapered surface 32 and step part 33 and is rotatable within the hole 5.

As shown in FIGS. 13 to 21, the magazine frame 2 is also a square plate-shaped body and is integrally molded of a synthetic resin and easy to manufacture. In this magazine frame 2, a disc receiving recess 35 (disc receiving area) is formed in the central part of the main wall part 2a, right and left cut parts 36, 36 are formed in the rear end part, side wall parts 37, 37 are formed over the right and left side edges and cut parts on the upper surface, are tapered on the insides on both right and left side edges and are connected with the main part 2a, a rear wall part 38 is formed in the rear end part of the main wall part 2a, guide grooves 39, 39 are formed on both right and left side surfaces, right and left locking parts 40, 40 are formed in the front end part, a counterbore 41 for arranging the shutter plate 3 is formed around the disc receiving recess 35 on the lower surface, a deep counterbore 43 deeper that this counterbore 41 and for arranging a shutter level 42 fixed to the shutter plate 3 is formed within the counterbore 41 in the rear end part of the lower surface, screw holes 44, 44, . . . for fixing the magazine plate 4 are formed in the four corners on the lower surface and a hole 45 is formed in the right and left directions of the lower surface of the rear end part. The rear end part of the above mentioned side wall part 37 is positioned as separated by a fixed dimension from the side end surface of the rear wall part 38 and an engaging groove 46 for fitting the boss 11 of the upper case 1 is formed in this rear end part. A rack 47 to mesh with a disc case feeding pinion provided in the disc reproducing apparatus is formed on the bottom surface of one of the guide grooves 39, 39.

The above mentioned locking part 40 is to lock the upper case 1 and magazine frame 2 with each other in cooperation with the operating part 10 of the upper case 1 and is shown in detail in FIGS. 13 and 18. As shown in these drawings, recesses 50 and holes 51 are formed in the front end part of the main wall part 2a. The wall part between the recess 50 and hole 51 is the locking part 40 which projects a little upward in the upper end from he upper surface of the main wall part 2a and has a pawl 52 projecting rearward on the rear surface of the upper end part as shown in FIG. 18. The thus constructed locking part 40 can engage with the operating part 10 as described later. By the way, the main wall part 2a is made a little thicker than the disc 21.

Figure 24:
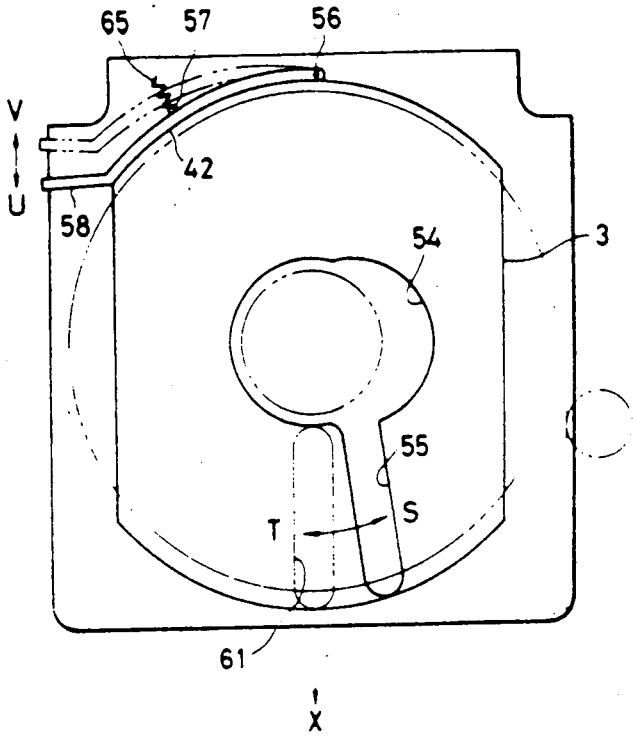
FIG. 24 is a view showing the operation of the shutter plate in FIG. 4.

As shown in FIGS. 4 and 24, the shutter plate 3 is a thin plate body formed of a synthetic resin and is formed to be of a shape of a circular plate body cut linearly by a predetermined dimension in the opposed outer peripheral parts, a deformed elliptic hole 54 is formed in the center part, a slot 55 connected to the hole 54 is formed in the front half part and the shutter lever 42 made of a synthetic resin is fixed to the rear end edge by means of welding or adhesive. The shutter lever 42 has a shaft part 56 projecting upward in the base end part, has a projection 57 projecting rearward in the intermediate part of its length and has in the tip part an operated part 58 projecting outward of the shutter plate 3.

The magazine plate 4 is a square plate body made of a metal and contributes to the strength or rigidity of the disc case. This magazine plate 4 is to be fixed to the lower surface of the above mentioned magazine frame 2 and is of an outline substantially coinciding with the contour of the magazine frame 2. In this magazine plate 4, as shown in FIG. 4, as turntable inserting aperture 60 is formed in the central part, a laser beam introducing hole 61 is formed in the front half part, right and left positioning holes 62, 62 are formed in the front end part and fitting holes 63, 63 . . . for the magazine frame 2 are formed in the four corners. In this magazine plate 4, as shown in FIGS. 4, 22 and 23, an annular spacer 64 made of a synthetic resin is fixed by means of adhesive to the peripheral edge part of the turntable inserting aperture 60. The upper end part of the spacer 64 projects slightly above the upper surface of the magazine plate 4.

The assembly of the above mentioned respective members is as follows. First, as shown in FIGS. 2 to 4, the upper case 1 is connected to the magazine frame 2 by fitting the right and left bosses 11 in the engaging grooves 46 in the magazine frame 2 so that the upper case 1 can be rotated with the boss 11 as a center with respect to the magazine frame 2 to open and close the disc receiving recess 35. Thus, the disc case can be formed to be thin.

The shutter plate 3 is arranged within the counterbore 41 while the shaft part 56 of the shutter lever 42 fixed there is fitted in the hole 45 in the magazine frame 2, and this shutter lever 42 is arranged within the deep counterbore 43 and is held within the counterbore 41 as the magazine plate 4 is fixed to the magazine frame 2 as described later. As shown in FIG. 24, this shutter plate 3 is free to rotate in the directions indicated by the arrows S and T with the shaft part 56 as a center and is normally biased in the direction indicated by the arrow S by a shutter spring 65 interposed between the projection 57 of the shutter lever 42 and the magazine frame 2. By the way, here the rotating range of the shutter plate 3 is regulated to be in a fixed range by the side wall of the counterbore 41 on the magazine frame 2. Further, the shutter plate 3 has a small stroke for the opening and closing operation as its rotating center is deviated from the center of the shutter plate 3.

As shown in FIGS. 22 and 23, the magazine plate 4 is contacted with the lower surface of the magazine frame 2 by inserting the spacer 64 in the upper end part in the hole 54 of the shutter plate 3 and is fixed to the magazine frame 2 by fastening screws not illustrated in screw holes 44 through fitting holes 63. (By the way, instead of the screw fastening, bosses may be formed on the magazine frame 2 side, may be fitted to the magazine plate 4 and then may be calked to fix the magazine plate 4.)

In the above mentioned construction, the shutter plate 3 is normally biased in the direction indicated by the arrow S to close the laser beam introducing hole 61 as shown in FIG. 24. At this time, the operated part 58 of the shutter lever 42 will project out of the opening sidewise of the deep counterbore 43 on the magazine frame 2 and will be moved in the direction indicated by the arrow U to be in the position indicated by the solid line.

In order to receive the disc 21 into the disc case of the above mentioned construction, as shown in FIG. 2, the upper case 1 is opened with the boss 11 as a center with respect to the magazine frame 2 and the disc 21 is received into the disc receiving recess 35 exposed outside. Then, as shown in FIG. 3, the upper case 1 is closed to close the disc receiving recess 35, the right and left unlocking operating parts 10 are engaged respectively with the locking parts 40 of the magazine frame 2 to lock the upper case 1 and magazine frame 2 with each other. In order to engage the unlocking operating part 10 with the locking part 40, when the plate part 10b of the operating part 10 is pressed toward the locking part 40, as shown in FIG. 11, the bent part 10a will come into the hole 51 in the magazine frame 2, the plate part 10b and operating wall part 10c will cover respectively the upper surface and front surface of the locking part 40, the thin part 15 of the bent part 10a will flex and the pawl 13 will engage with the pawl 52 so that the upper case 1 and magazine frame 2 will not be accidentally opened.

In this state, as shown in FIG. 22, the disc 21 received within will be pressed downward by the sponge ring 30 fixed to the stabilizer 20, will contact on the lower surface with the upper surface of the spacer 64 and will be held by this spacer 64 and sponge ring 30 so as not to accidentally move within the disc case.

Now, in order to open the disc case and take out the disc 21, as shown in FIGS. 3 and 11, the operating wall part 10c of the operating parts 10 are pushed in the direction indicated by the arrow W to flex the this parts 15 of the bent parts 10a and disengage the pawls 13 and 52 with each other and then the case 1 may be opened from the magazine frame 2.

The construction of the disc reproducing apparatus for reproducing the disc received in the above mentioned disc case shall be explained in the following. Such disc reproducing apparatus has a guide member for guiding the case to a predetermined playing position by engaging with the guide grooves 39, 39 of the disc case when the disc case containing the disc 21 is inserted into the apparatus, a pinion gear meshing with the rack 47 formed in one of the above mentioned guide grooves to carry the case to the predetermined position and an operating member for operating the operated part 58 of the shutter lever 42. Also, it has positioning pins for fixing the case in the predetermined position by engaging with the positioning holes 62, 62 of the disc case when the disc case if fed to the above mentioned predetermined position, a turntable 24 advancing into the spacer 64 to hold the disc 21 and rotating the disc 21 when it is played, a clamper 22 for pressing the stabilizer 20 downward to hold the disc 21 between the stabilizer 20 and turntable 24 and an optical head for reading the signal (information data) recorded in the disc 21 through the laser beam introducing hole 61.

The above mentioned turntable 24 is a disc-shaped member, has a fitting wall part 71 for fitting the disc 21 in the central part of the upper surface and has a disc holding part 72 on the outer periphery of the upper surface. The clamper 22 is also a disc-shaped member having a projecting wall part 73 in the central part on the lower surface.

In this apparatus, when the disc case is inserted by a predetermined amount into this apparatus, the above described pinion gear will be driven to carry the disc case in the direction X shown in FIGS. 3 and 24 to the above mentioned predetermined position. In this case, the operated part 58 of the shutter lever 42 of the disc case will contact the operating member arranged on the apparatus side and will be moved to the two-point chain line position form the solid line position in FIG. 24. Thereby, the shutter plate 3 will rotate in the direction indicated by the arrow T, and the slot 55 will coincide with the laser beam introducing hole 61 to open the hole 61.

When the disc case is thus placed in the predetermined position, the turntable 24 will advance into the disc case through the spacer 64, and the fitting wall part 71 will fit into the center hole of the disc 21. At the same time, the clamper 22 will fit its projecting wall part 73 into the recess 23, and will press the stabilizer 20 downward. Thereby, the disc 21 as fitted to the fitting wall part 71 of the turntable 24 will be securely held between the disc holding part 72 of this turntable 24 and the disc holding part 28 of the stabilizer 20. By the way, at this time, the sponge ring 30 will be greatly compressed to strongly contact the disc 21.

Here, if a playing instruction is given to the apparatus, the turntable 24 will rotate, thereby the disc 21 will be rotated together with the clamper 22 and stabilizer 20, and the optical head will read out the signal recorded on the disc 21 through the laser beam introducing hole 61 to reproduce the disc 21.

The above mentioned disc reproducing apparatus is an example of the apparatus for reproducing the disc by using the above described disc case.

By the way, in this embodiment, as the disc receiving recess 35 is formed in the main wall part 2a of the magazine frame 2, and the main wall part 2a is made thicker than the disc 21, there are advantages that the space of the disc receiving area can be efficiently secured, and the entire case can be formed to be thin. Further, as the rotating center of the shutter plate 3 (the shaft part 56 of the shutter lever 42) is provided in the rear end part of the shutter plate 3 on the side opposite to the side on which the slot 55 is formed, there is an advantage that the moving stroke on the slot 55 side can be taken to be large with a small displacement of the shutter lever 42 to secure the operation of opening and closing the laser beam introducing hole 61.

FIGS. 25 to 49 show a second embodiment of the present invention.

Figure 25:
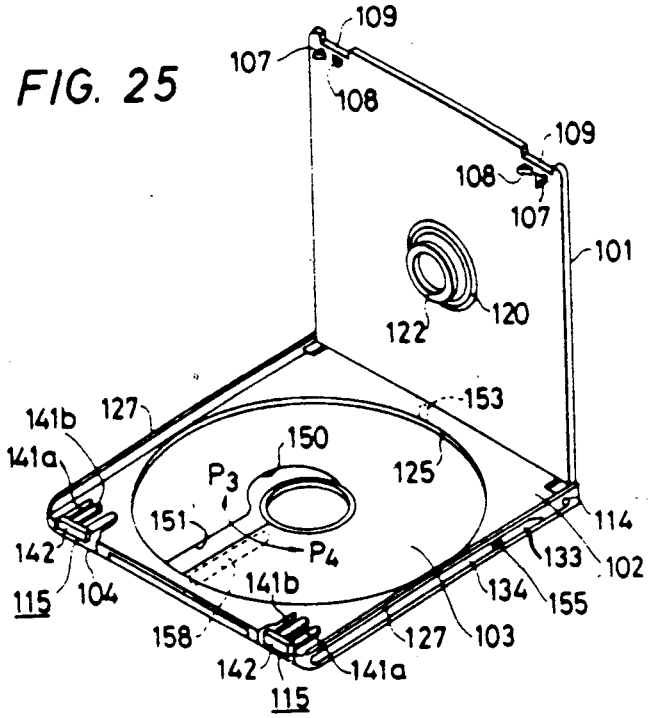
FIG. 25 is a perspective view of another embodiment of the disc case according to the present invention in an opened state.
Figure 26:
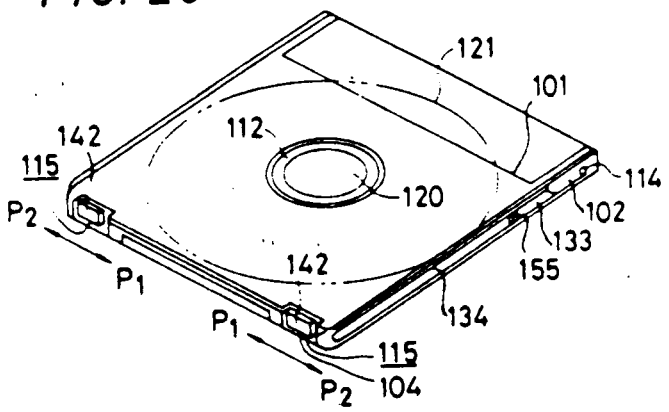
FIG. 26 is a perspective view of the disc case in FIG. 25 in a closed state.
Figure 27:
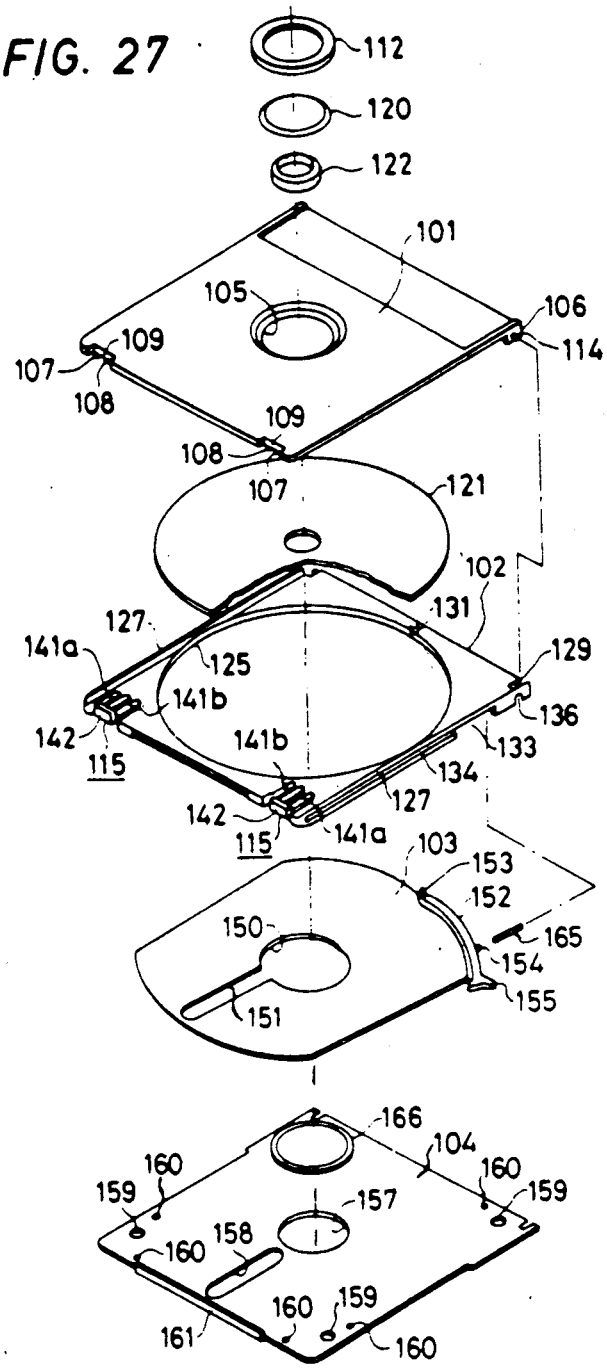
FIG. 27 is an exploded perspective view of the disc case in FIG. 25.

FIGS. 25 to 27 show the entire construction of the disc case of the second embodiment. As shown in these drawings, the disc case has as main components a lid 101, a magazine frame 102, a shutter plate 103 and a magazine plate 104.

Figure 28:
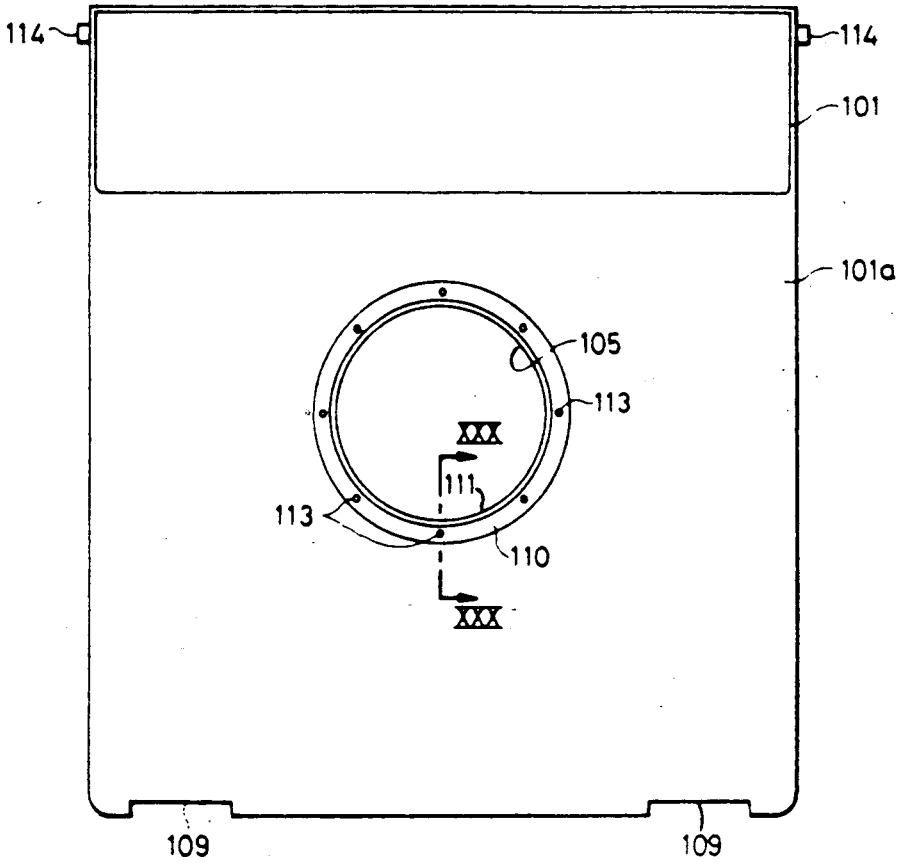
FIG. 28 is a plan view of the upper case in FIG. 27.
Figure 29:
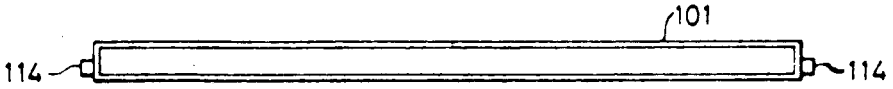
FIG. 29 is an elevation of the upper case in FIG. 27.
Figure 30:
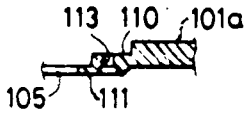
FIG. 30 is a sectioned view along line XXX—XXX in FIG. 28.

As shown in FIGS. 28 to 34, the lid 101 is a square plate-shaped body. This lid 101 integrally molded of a transparent synthetic resin and has a main wall part 101a with a hole 105 formed in its central part, a rear wall part 106 formed on the lower surface of the rear end part thereof, hook parts 107 (locking parts) and projections 108 formed on both right and left sides on the lower surface of the front end part and cut parts 109 formed in front of these hook parts 107 and projections 108. As shown in FIGS. 28 and 30, the hole 105 is so formed as to be smaller steppedly downward in turn to have step parts 110 and 111 within it. Holes 113, 113, . . . for fixing a ring 112 are formed in the step part 110 within this hole 105. Bosses 114, 114 for connecting with the magazine frame 102 are formed on the right and left outer end surfaces of the rear wall part 106.

Figure 31:
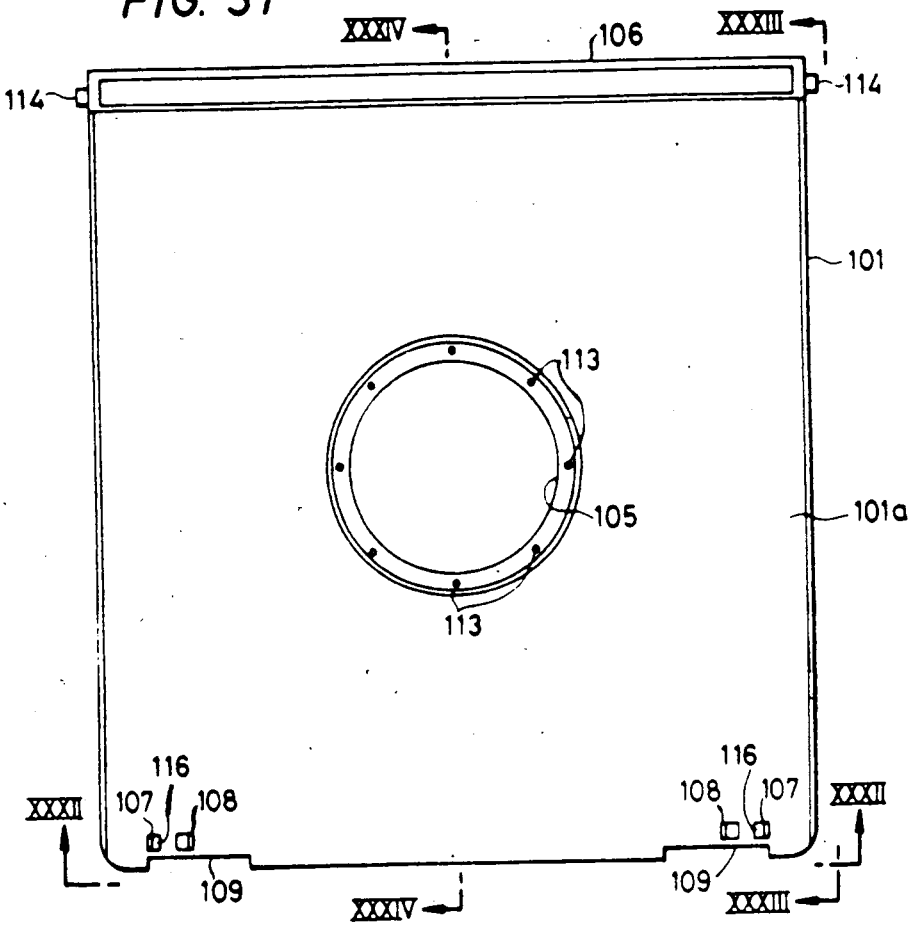
FIG. 31 is a bottom view of the upper case in FIG. 27.
Figure 32:
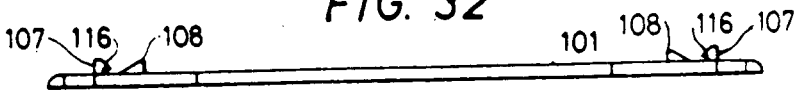
FIG. 32 is an elevational view along line XXXII—XXXII in FIG. 31.
Figure 33:
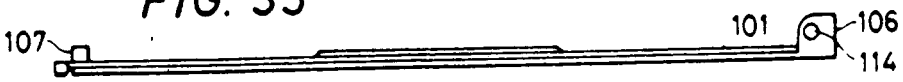
FIG. 33 is a side view along line XXXIII—XXXIII in FIG. 31.
Figure 34:
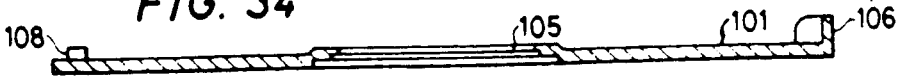
FIG. 34 is a sectioned view along line XXXIV—XXXIV in FIG. 31.
Figure 35:
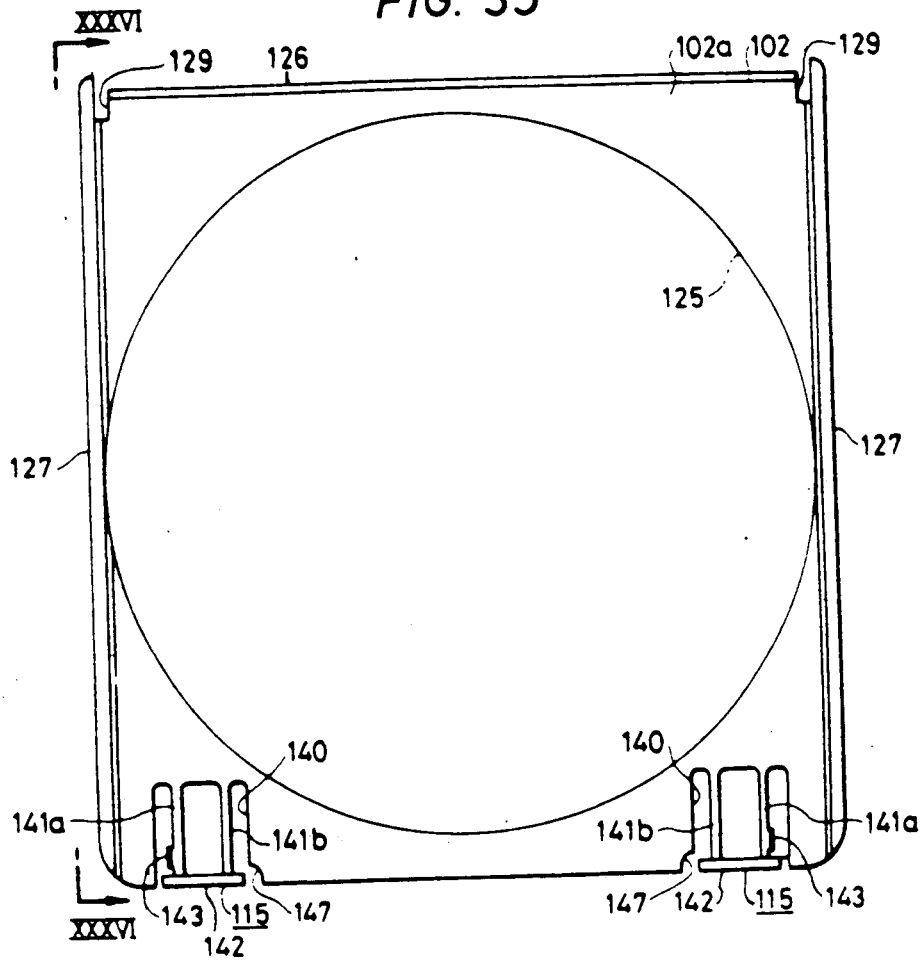
FIG. 35 is a plan view of the magazine frame in FIG. 27.
Figure 36:
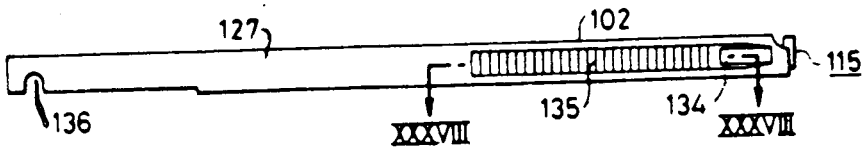
FIG. 36 is a side view along line XXXVI—XXXVI in FIG. 35.
Figure 37:
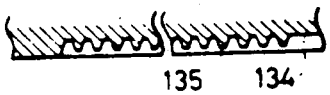
FIG. 37 is a sectioned view along line XXXVII—XXXVII in FIG. 36.
Figure 38:
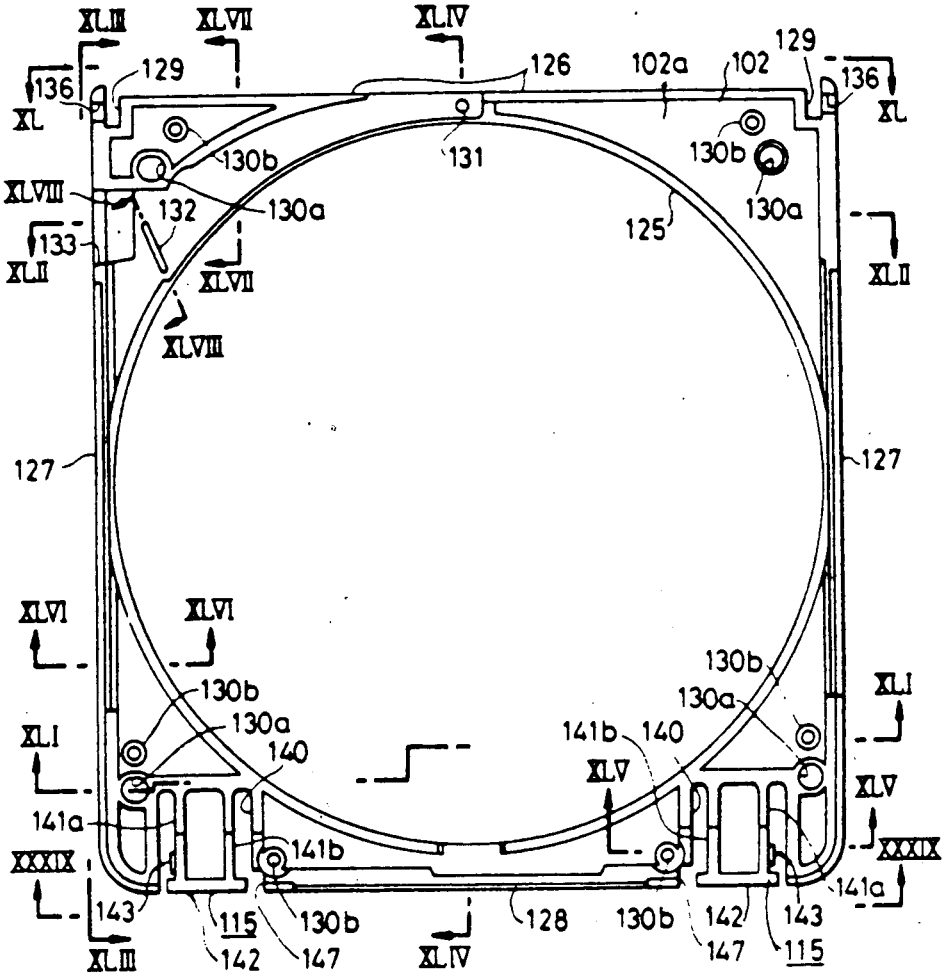
FIG. 38 is a bottom view of the magazine frame is FIG. 27.
Figure 39:
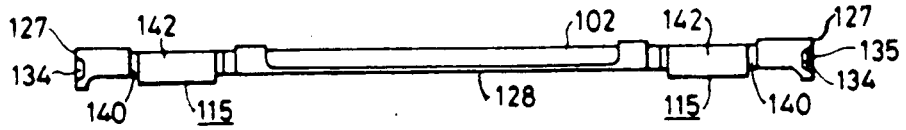
FIG. 39 is an elevational view along line XXXIX—XXXIX in FIG. 38.
Figure 40:
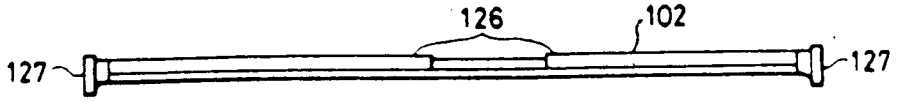
FIG. 40 is a back side view along line XL—XL in FIG. 38.
Figure 41:
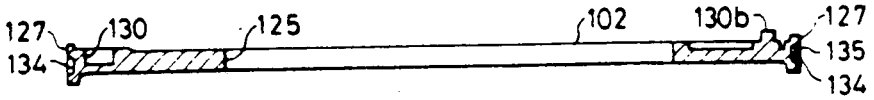
FIG. 41 is a sectioned view along line XLI—XLI in FIG. 38.
Figure 42:
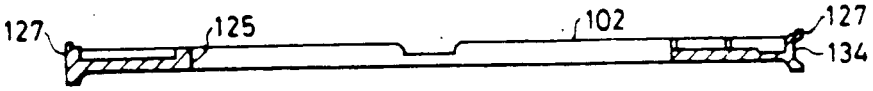
FIG. 42 is a sectioned view along line XLII—XLII in FIG. 38.
Figure 43:
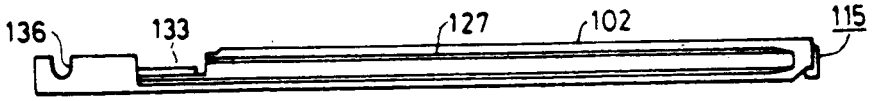
FIG. 43 is a side view along line XLIII—XLIII in FIG. 38.
Figure 44:
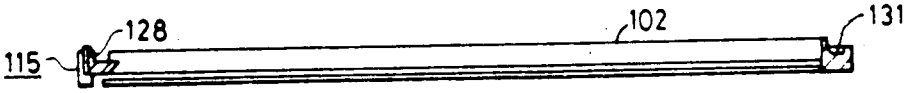
FIG. 44 is a sectioned view along line XLIV—XLIV in FIG. 38.
Figure 45:
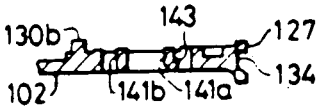
FIG. 45 is a sectioned view along line XLV—XLV in FIG. 38.
Figure 46:
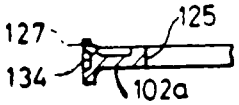
FIG. 46 is a sectioned view along line XLVI—XLVI in FIG. 38.
Figure 47:
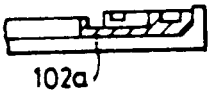
FIG. 47 is a sectioned view along line XLVII—XLVII in FIG. 38.
Figure 48:
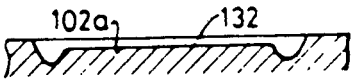
FIG. 48 is a sectioned view along line XLVII—XLVII in FIG. 38.

The above mentioned hook parts 107 and projections 108 form a locking device together with an unlocking operating part 115 of the magazine frame 102 (detailed later). As shown in FIGS. 31, 32 and 49, the hook part 107 is so formed as to project below the main wall part 101a and has a pawl 116 in the lower end part. The side surface of the pawl 116 is a sloped surface 117. The proejction 108 forms a pop-up part for moving the lid 101 upward at the time of the operation of unlocking the locking device and is so formed as to project downward on the side of the hook part 107. The surface of this projection 108 opposed to the hook part 107 is made a sloped surface 118.

In the lid 101 formed as mentioned above, as shown in FIGS. 25 to 27, a stabilizer 120 is arranged within the hole 105 and is a disc-shaped member made of a synthetic resin to hold a disc (compact disc) 121. A sponge ring 122 contacting the disc 121 and this stabilizer 120 is fixed to the lower surface of this stabilizer 120. This stabilizer 120 is rotatably arranged on the step part 111 within the hole 105 and is prevented by ring 112 fixed on the step part 110 from being pulled out upward. In this case, the ring 112 is formed of a synthetic resin, has a plurality of projections (not illustrated) on the lower surface and is fixed to the lid 101 by inserting and heat welding these projections in respective holes 113, 113, . . .

As shown in FIGS. 35 to 48, the magazine frame 102 is also a square plate-shaped body, is integrally molded of a synthetic resin and can be easily manufactured. In this magazine frame 102, a disc receiving recess 125 (disc receiving area) is formed in the central part of the main wall part 102a, a rear wall part 126 is formed on the lower surface of the rear end part, side wall parts 127, 127 is formed in both right and left side parts, a front wall part 128 is formed on the lower surface of the front end part, cut parts 129, 129 are formed between the rear end parts of the side wall parts 127, 127 and the rear wall part 126, location pin inserting holes 130a, 130a, . . . are formed in the four corners, magazine plae fitting bosses 130b, 130b, . . . are formed on the lower surfaces of the four corners, unlocking operating parts 115, 115 are formed in both right and left side parts of the front end part, a shutter lever supporting hole 131 is formed in the middle part of the lower surface of the rear end part, a shutter spring receiving groove 132 if formed in one side part of the lower surface of the rear end part and a shutter lever receiving cut part 133 is formed on the lower surface of the rear end part of one side wall part 127. Guide grooves 134, 134 are formed respectively on the outer surfaces of the side wall parts 127, 127, and a rack gear 135 is formed on the bottom surface of one guide groove 134. Supporting grooves 136 for supporting respectively the bosses 114 of the lid 101 are formed in the rear end parts of the side walls parts 127, 127.

The contour of the unlocking opeating part 115 is shown in detail in FIGS. 35, 38, 39, 45 and 49. As shown in these drawings, a cut recess 140 is formed in the front end part of the main wall part 102a, and the unlocking operating part 115 is provided within this cut recess 140.

That is to say, two sets of forward extending elastically deformable arms 141a and 141b are formed respectively at a predetermined spacing on the right and left. An unlocking operating button 142 is formed to cover the arms 141a and 141b in the front end parts of these arms. A locking pawl 142 projecting sidewise is formed in the upper part of the front end of the arm 141a of the two arms. The contour of the arm 141a is shown in detail in FIG. 49. As shown in this drawing, the upper surface of the locking pawl 143 is made a sloped surface 144. A sloped surface 145 is also formed on the surface on the side opposite to the side on which the locking pawl 143 is formed. The arm 141a having this sloped surface 145 together with the projection 108 of the above described lid 101 forms a pop-up part moving the lid 101 upward when the lid 101 is opened. The front end surface of the unlocking operating button 142 is formed to be rough so as to obtain a proper frictional force when the button is operated with a finger.

In the unlocking operating part 115 formed as mentioned above, when it is operated with a finger contacted with the front surface of the unlocking operating button 142, the button 142 and arms 141a and 141b will be able to be displaced in the direction indicated by the arrows $P_1$ and $P_2$, that is, in the directions of arranging the arms 141a and 141b by elastically deforming the arms 141a and 141b. By the way, in this case, a cut part 147 connected to the cut recess 140 is formed in the main wall part 102a so that, when the operating button 142 is moved in the direction indicated by the arrow $P_1$, this button 142 may not contact the main wall part 102a.

As shown in FIG. 27, the shutter plate 103 is a thin plate body formed of a synthetic resin, is formed to be a circular plate body cut linearly by a predetermined dimension in the opposed outer peripheral parts, and has a deformed elliptic hole 150 formed in the center part, a slot 151 connected to the hole 150 and formed in the front half part and a shutter lever 152 made of a synthetic resin and fixed by such means as of welding or adhesion to the rear end edge. The shutter lever 152 has an upward projecting shaft part 153 in the base end part, a projection 154 in the intermediate part in the longitudinal direction and an operated part 155 projecting toward the outside of the shutter plate 103 in the tip part.

The magazine plate 104 is a square plate body made of a metal and contributes to the strength or rigidity of the disc case, is fixed to the lower surface of the above mentioned magazine frame 102 and is of an outline substantially coinciding with the contour of the magazine frame 102. In this magazine plate 104, a turntable inserting aperture 157 is formed in the central part, a laser beam introducing hole 158 is formed in the front half part, location pin inserting holes 159, 159, . . . and fitting holes 160, 160, . . . are formed in the four corners, and a front wall part 161 is formed in the front end part.

The assembly of the above mentioned respective member is as follows. First, as shown in the FIGS. 25 to 27, the lid 101 is connected to the magazine frame 102 by positioning both right and left end parts of the rear wall part 106 respectively within the cut parts 129, 129 of the magazine frame 102 and fitting the bosses 114, 114 respectively within the supporting grooves 136, 136 so that is can be rotated with the bosses 114, 114 as a center with respect to the magazine frame 102 to open and close the disc receiving recess 125.

The shutter plate 103 is arranged on the lower surface of the main wall part 102a of the magazine frame 102, while the shaft part 152 of the shutter lever 152 fixed there is fitted in the shutter lever supporting hole 131 of the magazine frame 102, and the operated part 155 of this shutter lever 152 is projected out of the cut part 133, and is held in its position as the magazine place 104 is fixed to the magazine frame 102 as described later. In this case, a spring 165 is arranged in the groove 132 of the magazine plate 102 and is engaged at one end with the projection 154 of the shutter lever and at the other end with the magazine plate 102. In this construction, as shown in FIG. 25, the shutter plate 103 is rotatable in the directions indicated by the arrows $P_3$ and $P_4$ with the shaft part 153 as a center and is normally biased in the direction indicated by the arrow $P_3$ by the biasing force of the spring 165.

The magazine plate 104 is contacted with the lower surface of the magazine frame 102 fitted with the shutter plate 102 by inserting and welding the bosses 130b, 130b, . . . formed on the magazine frame 102 respectively in the fitting holes 160. In this case, a spacer 166 made of a synthetic resin and shown in FIG. 27 is fixed to the upper surface of the peripheral edge part of the turntable inserting aperture 157 of the magazine plate 104. In this construction, the location pin inserting holes 159, 159, . . . of the magazine plate 104 are so positioned as to coincide respectively with the positions of the location pin inserting holes 130a, 130a, . . . of the magazine frame 102. The laser beam introducing hole 158 of the magazine plate 104 will be closed by the shutter plate 103 when the shutter plate 103 is moved in the direction indicated by the arrow $P_3$.

Figure 49A:
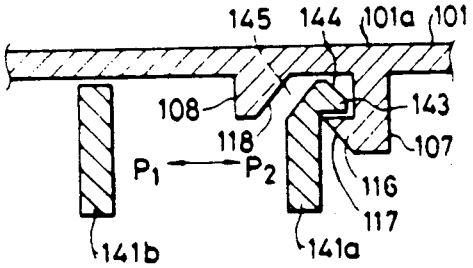
FIG. 49a, 49b and 49c are views for explaining the operations for unlocking and popping up the lid 101 in FIG. 25.

In order to receive the disc 121 into the disc case of the above mentioned construction, as shown in FIG. 25, the lid 101 is rotated to open with the boss 114 as a center with respect to the magazine frame 102, and the disc 121 is received into the disc receiving recess 125 exposed outside. Then, as shown in FIG. 26, the lid 101 is closed and, as shown in FIG. 49a, the pawl 116 of the hook part 107 formed on the lid 101 is engaged with the pawl 143 of the unlocking operating part 115 to lock the lid 101 and magazine frame 102 with each other. In the case of engaging the pawl 116 with pawl 143, when the hook part 107 is lowered, the sloped surface 117 of the pawl 116 will contact the sloped surface 144 of the pawl 143 and the sloped surfaces 117 and 144 will guide each other to slightly displace the arm 141a in the direction indicated by the arrow $P_1$ and, when the pawl 116 is positioned below the pawl 143, the arm 141a will elastically return to engage these pawls 116 and 143 with each other. As the engagement of these pawls 116 and 143 is normally biased in the locking direction, they will be not be accidentally disengaged with each other. Therefore, in this state, the lid 101 and magazine frame 102 will not be accidentally unlocked. Here, the disc 121 received within will be pressed downward by the sponge ring 122 and will be held between this sponge ring 122 and the spacer 166 fixed to the magazine plate 104.

Figure 49B:
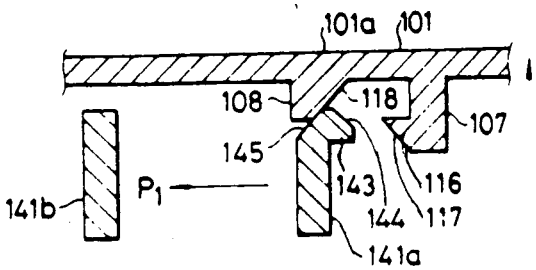
Figure 49C:
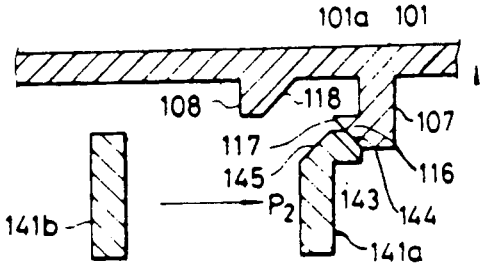

Now, in order to open the disc case to take out the disc 121, as shown in FIGS. 26 and 49a, when the unlocking operating button 142 of each locking operating part 115 is pressed with a finger and is moved in the direction indicated by the arrow $P_1$, the arms 141a and 141b will be displaced in the direction indicated by the arrow $P_1$ to disengage the pawls 116 and 143 with each other and the lid 101 and magazine frame 102 will be unlocked with each other. At this time, as shown in FIG. 49b, when the arm 141a moves in the direction indicated by the arrow $P_1$, the sloped surface 145 of the arm 141a will contact the sloped surface 118 of the projection 108 formed on the lid 101 and will guide the projection 108 upward to move the lid 101 slightly upward. When the finger is separated from the unlocking operating button 142, the arms 141a and 141b will slightly return in the direction indicated by the arrow $P_2$ due to the elastic returning force as shown in FIG. 49c. Then, at this time, the sloped surface 144 formed on the pawl 143 will contact the sloped surface 117 of the pawl 116, will guide the hook part 107 to move upward and will further move the lid 101 upward. Thus, when the lid 101 is operated to be unlocked by the operating button 142, the lid 101 and magazine frame 102 will be unlocked with each other and, at the same time, the lid 101 will be opened slightly upward, that is, popped up with respect to the magazine frame 102. Therefore, in this state, if the lid 101 is gripped in the front end part and is rotated to be opened as shown in the FIG. 25, the lid 101 can be easily operated to be opened. In this case, in the unlocking operating part 115, as the unlocking operating button 142 is supported by the elastically deformable arm 141a (141b) and all these constructions are integrally formed in the magazine frame 102, the so-called parts to be operated from outside, the power transmitting construction from there to the engaging means and the construction for guiding or supporting these members can be reasonably realized by a very simple construction and the smooth operation and positive locking of the operating button can be well satisfactory as the elastic force of the arm is utilized. Furthermore, as this operating button 142 is supported by the two arms 141a and 141b, this button 142 can be moved only in the directions (indicated by the arrows $P_1$ and $P_2$) of arranging the arms 141a and 141b can be prevented from being moved in any other direction and can be easily moved in the predetermined directions. By the way, here the case is so made as to be unlocked by moving the operating buttons 142, 142 in the direction indicated by the arrow $P_1$. However, on the contrary, the case may be so made as to be unlocked by moving the buttons in the direction indicated by the arrow $P_2$.

The construction of the apparatus for reproducing the disc received in the above mentioned disc case shall be explained in the following. Such disc reproducing apparatus has a guide member engaging with the guide grooves 134, 134 of the disc case to guide the case to the determined position for disc reproducing when the disc case containing the disc 121 is inserted into the case, a pinion gear meshing with the rack gear 135 to carry the case to the above mentioned predetermined position and an operating member operating the operated part 155 of the shutter lever 152. It has also location pins engaging with the location pin inserting holes 159 and 130 a for the disc case to fix the case in the predetermined position when the disc case is fed to the above mentioned predetermined position, a turntable inserting aperture 157 to hold the disc being spaced from the spacer 166 and driven to rotate the disc 121 when it is to be reproduced, a clamper pressing the stabilizer 120 down ward to hold the disc 121 between the stabilizer 120 and turntable and an optical head for reading out the signal recorded on the disc 121 through the laser beam introducing hole 158.

For example, when the disc case is inserted by a predetermined amount into the apparatus, this device will drive the above described pinion gear to carry the disc to the predetermined position. In such case, the operated part 155 of the shutter lever 152 of the disc case will contact the operating member arranged on the apparatus side, will be moved together with the case being carried and will rotate the shutter plate 103 in the direction indicated by the arrow $P_4$ in FIG. 25 so that the slot 151 of the shutter plate 103 will coincide with the laser beam introducing hole 158 to open it.

When the disc case is thus placed in the predetermined position, the turntable will advance into the case through the turntable inserting aperture 157, the clamper will press the stabilizer 120 downward and the disc 121 will be held between the turntable and stabilizer 120. By the way, at this time, the sponge ring 122 will be compressed so greatly as to strongly contact the disc 121.

Here, if a disc reproducing (playing) instruction is given to the apparatus, the turntable will rotate, thereby the disc 121 will be rotated together with the clamper and stabilizer 120, and the optical head will read out the signal recorded on the disc 121 through the laser beam introducing hole 158 to reproduce the disc 121.

It should be noted here that, in the above embodiment, the left side pair of holes 130a, 130a (in FIG. 38) and corresponding holes 159, 159 for location are made into an elliptical form so that a setting operation of the disc case into the reproducing apparatus can be facilitated, and the upper side pair of holes 130a, 130a (in FIG. 38) and corresponding holes 159, 159 are disposed asymmetrically with the lower side ones so that an erroneous setting of the disc case can be inhibited.

By the way, the above mentioned disc reproducing apparatus is an example of the apparatus for reproducing the disc by using the above described disc case.

What is claimed is:

1. A disc case for receiving a disc on which information data are recorded and for supporting said disc rotatably in said disc case, said disc case being able to be set into a reproducing apparatus with said disc received in said disc case and receiving said disc releasably, wherein said disc case comprises:

a first case member having a disc receiving area on its central portion;

a second case member associated with said first case member to be able to open and close said disc receiving area; and locking means having two locking members, a first locking member which is formed integrally on one of said first and second case members and a second locking member which is formed integrally on the other of said first and second case members and locks said first and second case members in a closed state with said disc receiving area closed in cooperation with said first locking member, said second locking member having integrally an operating part which release the locking of said first and second case members when operated, said first locking member including a surface portion means which limits movement of said operating part to thereby reduce movement of said second locking member when said opening part is operated to release the locking of said first and second case members.

2. A disc case according to claim 1, wherein said operating part comprising an operating button, and wherein said second locking member comprises an elastic arm member connected to said operating button.

3. A disc case according to claim 2, wherein said elastic arm member comprising at least two arms arranged in line, and wherein the locking of said first and second case members is released by elastic deformations of said two arms in the direction of such line in accordance with the movement of said operating button which is produced by its operation in the direction of said line.

4. A disc case according to claim 2, wherein said disc case further comprises:

a spacing member for spacing said first and second case member, which is arranged on one of said first and second case member on which said first locking member is arranged, and which spaces said first and second case member from each other in the direction to open in accordance with the elastic deformation of said arms which is produced by the operation of said operating button.

5. A disc case for receiving a disc on which information data are recorded and for supporting said disc rotatably in said disc case, said disc case being able to be set into a reproducing apparatus with said disc received in said disc case and receiving said disc releasably, wherein said disc case comprises:

a first case member having a disc receiving area on its central portion;

a second case member associated with said first case member to be able to open and close said disc receiving area; and locking means for holding said first and second case member in a closed state with said disc receiving area closed; said locking means having a first locking member on said first case member and a second locking member on said second case member, said second locking member having an operating part which releases the locking of said first and second case members when operated, said first locking member including a surface portion means which limits the movement of said operating part to thereby reduce movement of said second locking member when said operating part is operated to release the locking of said first and second case members;

said first case member comprising a frame with a recess, which forms said disc receiving area, on its central portion; and a magazine plate applied to a surface of said frame;

said magazine plate being provided with an inserting aperture through which a turntable of the reproducing apparatus for driving to rotate said disc is introduced in a region of a position corresponding to said recess of said frame; and another inserting aperture through which a reproducing head of the reproducing apparatus accesses a portion of information data recorded on said disc.

6. A disc case according to claim 5, wherein said magazine plate is made of metal plate.

7. A disc case according to claim 5, wherein said frame of said first case member is made of plastics and provided with a plurality of bosses disposed on said frame for connecting said frame to said magazine plate; wherein said magazine plate is provided with a plurality of holes for engaging said bosses; and wherein said frame and said magazine plate are connected by press said bosses with heat in the state inserted into said holes of said magazine plate.

8. A disc case according to claim 7, wherein said magazine plate is made of metal plate.

9. A disc case according to claim 5, further comprising:

a shutter plate, which is interposed and supported rotatably between said frame and said magazine plate of said first case member, for opening and closing said another inserting aperture provided on said magazine plate by its rotation.

10. A disc case according to claim 9, wherein an axis of rotation of said shutter plate is eccentric to the center of said shutter plate, and wherein an operating part for operating said shutter plate to open and close is formed in a region near said axis of rotation.

11. A disc case according to claim 10, wherein said shutter plate has a substantially elliptical inserting aperture through which the turntable for driving to rotate said disc is introduced, and another inserting aperture of slit form through which the reproducing head accesses a portion of information data recorded on said disc when said shutter plate opened.

12. A disc case for receiving a disc on which information data are recorded and for supporting said disc rotatably in said disc case, said disc case being able to be set into a reproducing apparatus with said disc received in said disc case, wherein said disc case receives said disc releasably and wherein, while set into the reproducing apparatus, while said disc case is fixed in position within the reproducing apparatus, said disc is driven in rotation and said information data are reproduced by the reproducing apparatus, and wherein said disc case comprises:

a first case member having a disc receiving are on its central portion;

a second case member associated with said first case member to be able to open and close said disc receiving area;

locking means for holding said first and second case members in a closed state with said disc receiving area closed, said first case member having a first locking member and said second case member having a second locking member engagable with said first locking member, said second locking member having an operating part which releases the locking of said first and second case members when operated, said first locking member including a surface portion means which limits movement of said operating part to thereby reduce movement of said locking member when said operating part is operated to release the locking of said first and second case members; and at least a pair of holes, arranged on at least surface of said disc case, for positioning said disc case by engaging projections arranged on the reproducing apparatus during set into the reproducing apparatus, one hole of said pair of holes being formed as a loose hold.

13. A disc case according to claim 12, wherein said holes formed symmetrically with the center of said disc case.

*14. A disc case for receiving a disc on which information data are recorded and for supporting said disc rotatably in said disc case, said disc case being able to be set into a reproducing apparatus with said disc received in said disc case and receiving said disc releasably, wherein said disc case comprises:*

*a first case member having a disc receiving area on its central portion;*

*a second case member associated with said first case member to be able to open and close said disc receiving area so that a disc can be removed from said disc receiving area when said disc receiving area is open;*

*locking means having two locking members, a first locking member which is formed integrally on one of said first and second case members and a second locking member which is formed integrally on the other of said first and second case members and locks said first and second case members in a closed state with said disc receiving area closed in cooperation with said first locking member; and*

*a disc stabilizer rotatably supported within the disc case for supporting the disc disposed in said disc receiving area for rotation.*

*15. A disc case for receiving a disc on which information data are recorded and for supporting said disc rotatably in said disc case, said disc case being able to be set into a reproducing apparatus with said disc received in said disc case and receiving said disc releasably, wherein said disc case comprises:*

*a first case member having a disc receiving area on its central portion;*

*a second case member associated with said first case member to be able to open and close said disc receiving area so that a disc can be removed from said disc receiving area when said disc receiving area is open;*

*locking means having two locking members, a first locking member which is formed integrally on one of said first and second case members and a second locking member which is formed integrally on the other of said first and second case members and locks said first and second case members in a closed state with said disc receiving area closed in cooperation with said first locking member; and*

*a disc stabilizer rotatably supported within the disc case for supporting the disc disposed in said disc receiving area for rotation, and rotatably clamping the disc by cooperating with a disc rotation member of the reproducing apparatus so that the disc is rotatable in said case by the disc rotating member without contact between said disc and said disc case.*

*16. A disc case according to claim 15, further comprising aperture means to permit the disc enclosed within said disc case to be optically read by the reproducing apparatus, said disc and the reproducing apparatus being constructed as an optical recording and reproducing system including a light beam where said light beam is introducable from said reproducing apparatus through said aperture.*

* * * * *